US010766163B2

(12) United States Patent
Padget (10) Patent No.: US 10,766,163 B2
(45) Date of Patent: Sep. 8, 2020

(54) BLADE ATTACHMENT FOR AN OSCILLATING TOOL (71) Applicants: Robert Bosch Tool Corporation, Broadview, IL (US); Robert Bosch GmbH, Stuttgart (DE)

(72) Inventor: Brad Padget, Huntley, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 181 days.

(21) Appl. No.: 14/564,548

(22) Filed: Dec. 9, 2014

(65) Prior Publication Data

US 2015/0165633 A1 Jun. 18, 2015

Related U.S. Application Data (60) Provisional application No. 61/914,184, filed on Dec. 10, 2013.

(51) Int. Cl.
*B23D 61/00* (2006.01)
*B27B 19/00* (2006.01)

(52) U.S. Cl.
CPC .......... *B27B 19/008* (2013.01); *B23D 61/006* (2013.01); *Y10T 83/04* (2015.04); *Y10T 83/8817* (2015.04)

(58) Field of Classification Search
CPC . B26D 1/11; B26D 1/25; B26D 1/255; B26D 1/26; B26D 1/265; B26D 1/28;
(Continued)

(56) References Cited

U.S. PATENT DOCUMENTS 1,380,814 A * 6/1921 Lindsay ................. B23D 49/11
30/503.5
1,627,622 A * 5/1927 Schreiner ............... B23D 49/11
30/503.5
(Continued)

FOREIGN PATENT DOCUMENTS

CA      2241104 A1    12/1999
DE  102012204864 A1     6/2013
(Continued)

OTHER PUBLICATIONS

International Search Report and Written Opinion corresponding to PCT Application No. PCT/US2014/069293, dated Mar. 10, 2015 (14 pages).
(Continued)

*Primary Examiner* — Clark F Dexter
(74) *Attorney, Agent, or Firm* — Maginot, Moore & Beck LLP (57) ABSTRACT A blade attachment, configured to be coupled to a power tool, enables two parallel cuts to be made simultaneously. The blade attachment includes an intermediate portion, configured to be coupled to the power tool, and two blade portions, configured to be coupled to opposite sides of the intermediate portion. The two blade portions are formed to mirror one another and are arranged to be opposite and parallel to one another on the blade attachment. Each of the blade portions includes an interface leg, which is coupled to the intermediate portion, and a blade leg, which extends downwardly from the interface leg at an angle. Each blade leg includes a plurality of teeth configured to make a cut.

15 Claims, 5 Drawing Sheets (58) Field of Classification Search
CPC .......... B26D 1/285; B26D 1/29; B26D 1/295;
B26D 1/30; B26D 1/305; B27B 19/008;
B27B 19/006; A61B 17/147; A61B
17/1637; A61B 17/1695; B02C 1/007;
B23D 61/006
USPC .......... 30/501, 502, 503, 503.5; 83/610–612,
83/620; 606/176–178, 180
See application file for complete search history.

(56) References Cited

U.S. PATENT DOCUMENTS

| | | | | |
|---|---|---|---|---|
| 3,470,923 | A * | 10/1969 | Besthorne | B23D 49/11 144/133.1 |
| 3,503,294 | A | 3/1970 | Vinciguerra et al. | |
| 4,096,964 | A * | 6/1978 | Glick | H02G 3/12 220/3.4 |
| 4,593,467 | A * | 6/1986 | Safar | B23B 51/05 30/300 |
| 5,048,190 | A * | 9/1991 | Aurness et al. | B23D 49/006 30/299 |
| 5,236,290 | A * | 8/1993 | Mittleman et al. | B23B 51/05 408/183 |
| 5,728,117 | A * | 3/1998 | Lash | A61B 17/32053 606/107 |
| 5,860,218 | A | 1/1999 | Vinciguerra | |
| 5,867,913 | A * | 2/1999 | Pettigrew | B23D 49/003 144/363 |
| 5,910,202 | A * | 6/1999 | DeMarc | B26F 1/3846 30/300 |
| 6,120,220 | A * | 9/2000 | Speare | B23B 51/05 408/1 R |
| 6,457,915 | B1 * | 10/2002 | Kao | B23B 51/05 408/204 |
| 8,075,578 | B2 * | 12/2011 | Deli et al. | A61F 9/00763 606/166 |
| 8,206,392 | B2 * | 6/2012 | Fisher et al. | A61B 17/14 606/176 |
| 8,814,872 | B2 * | 8/2014 | Bickenbach | A61B 17/14 30/503 |
| 8,840,344 | B2 * | 9/2014 | Stenman | B23B 51/05 408/186 |
| 9,358,623 | B2 * | 6/2016 | Burks et al. | B23D 49/003 |
| 2005/0245935 | A1 | 11/2005 | Casey et al. | |
| 2010/0241130 | A1 | 9/2010 | Deli et al. | |
| 2011/0072946 | A1 | 3/2011 | Bernardi et al. | |
| 2011/0092975 | A1 * | 4/2011 | Fisher et al. | A61B 17/14 606/82 |
| 2012/0125171 | A1 | 5/2012 | Chen et al. | |
| 2012/0144676 | A1 | 6/2012 | Davidian et al. | |
| 2012/0183366 | A1 * | 7/2012 | Stenman | B23Q 11/0071 408/1 BD |
| 2013/0039708 | A1 * | 2/2013 | Stenman | B23B 51/05 408/16 |
| 2013/0181414 | A1 | 7/2013 | Haman | |

FOREIGN PATENT DOCUMENTS

| | | |
|---|---|---|
| EP | 0114074 B1 | 4/1987 |
| EP | 2639021 A1 | 9/2013 |
| JP | 10-34597 * | 2/1998 |
| WO | 2007086767 A1 | 8/2007 |

OTHER PUBLICATIONS

UK Examination Report corresponding to Patent Application No. GB1609166.2 (7 pages).
English Translation of Chinese First Office Action corresponding to Chinese Patent Application No. 201480067235.0 (13 pages).

* cited by examiner

BLADE ATTACHMENT FOR AN OSCILLATING TOOL

PRIORITY CLAIM

This application claims priority to U.S. provisional patent application No. 61/914,184, filed on Dec. 10, 2013 and entitled "Blade Attachment for an Oscillating Tool," the disclosure of which is incorporated herein by reference in its entirety.

TECHNICAL FIELD

This disclosure generally relates to handheld power tools, and more particularly to a blade attachment for such tools.

BACKGROUND

Handheld oscillating power tools that perform sawing and other types of cutting are known and are used in a wide variety of applications. For example, oscillating saws can be used to cut openings in drywall for the insertion of outlet boxes and/or to cut openings in flooring material for the insertion of floor vents. Such oscillating tools generally have a motor with an oscillating shaft that extends from a nose portion that is configured to have various accessories or attachment devices, like different saw blades, mounted thereon.

As is known in the art, cutting openings in drywall can be a tedious and time consuming task due to the need for the opening to have a precise shape and size. To provide an opening that will accept the outlet box or floor vent mounted within it and to enable a pleasant aesthetic when a face plate or cover is attached, the opening should consist of two sets of parallel cuts of particular lengths. Cutting two independent parallel lines requires each line to be measured precisely to ensure that they will be parallel with one another. Additionally, because the lines are being cut in a wall or a floor, the position of each line relative to the rest of the wall or floor must also be measured precisely to ensure that the opening will be in the desired location.

Figure 5:
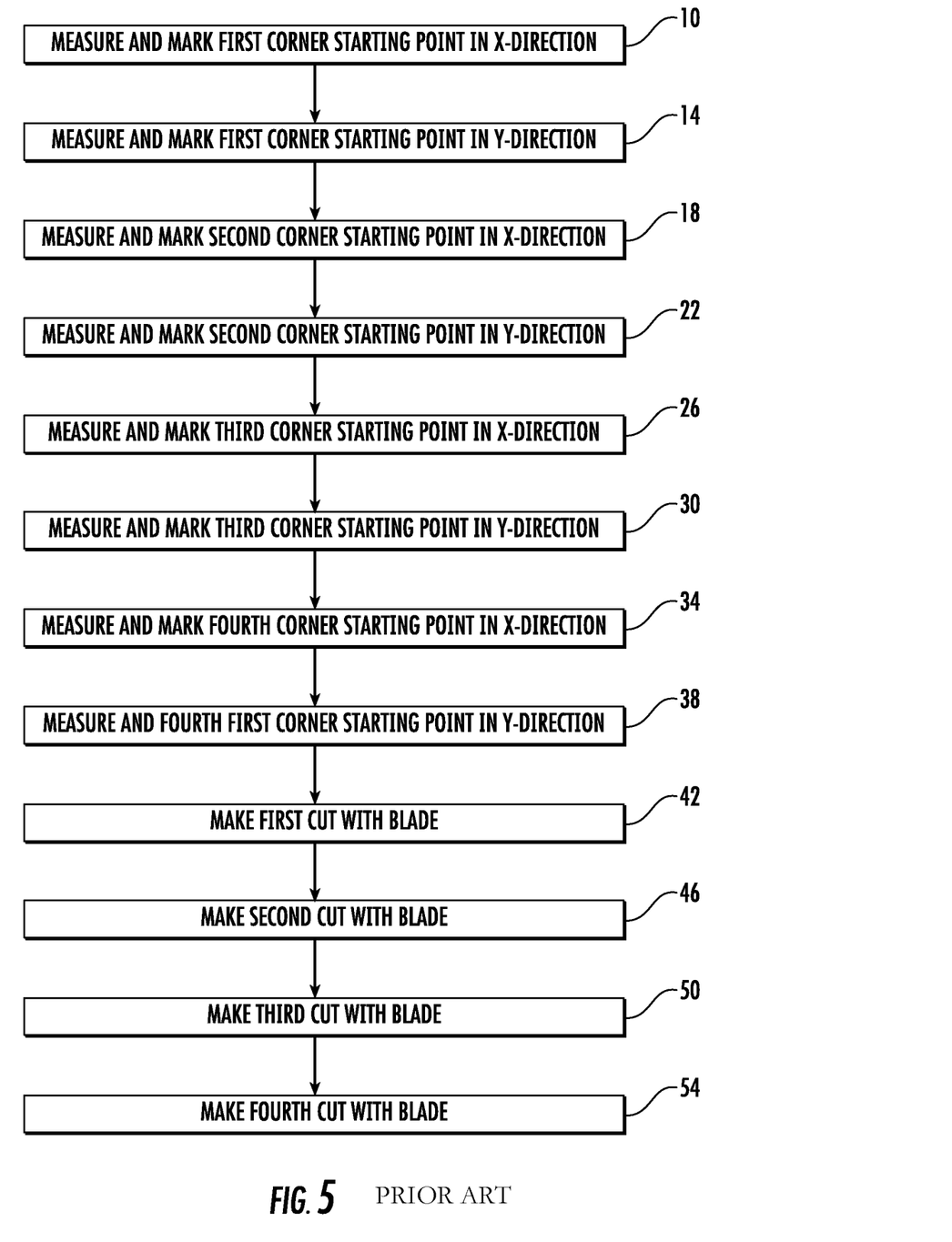
FIG. 5 is a flow chart depicting a prior art method for cutting a rectangular opening.

As shown in FIG. 5, previously known methods of using an oscillating tool to cut such openings may require a large number of independent actions to be performed. First, the user must measure and mark the first corner of the desired opening including measuring and marking both an x-direction component (10) and a y-direction component (14). The user must repeat the same steps to measure and mark the x-direction component (18) and the y-direction component (22) for the second corner, to measure and mark the x-direction component (26) and the y-direction component (30) for the third corner, and to measure and mark the x-direction component (34) and the y-direction component (38) for the fourth corner of the desired opening. Each corner must be measured and marked in both the x-direction and the y-direction to ensure that the lines cut between the corners will be parallel to one another and parallel to the sides and edges of the wall or floor in which the opening is being cut so that the resulting opening is aligned and positioned as desired on the wall or floor. Then, the user must separately make each of the first cut (42), the second cut (46), the third cut (50), and the fourth cut (54) to form the resulting opening.

While this known method is effective for cutting the desired openings in drywall and/or flooring materials, it requires the user to perform several actions, which is tedious and time consuming. Accordingly, it would be beneficial to provide an improved tool and method for cutting such openings which are more convenient, efficient, and easy to use.

SUMMARY

Embodiments of this disclosure are directed to a blade attachment for a portable or a handheld oscillating tool. The blade attachment is configured to cut a multi-sided opening, for example, an opening for an outlet box, a floor vent, or the like. To this end, the blade attachment includes an intermediate portion supporting two blade portions which are configured to simultaneously cut two parallel lines to form two opposing sides of the multi-sided opening. In an alternative embodiment, more than two blade portions may be supported by the same intermediate portion. In another alternative embodiment, the oscillating tool may include a second blade attachment having a second intermediate portion with two blade portions supported by the second intermediate portion, in similar fashion as the first blade attachment.

DETAILED DESCRIPTION

Figure 1:
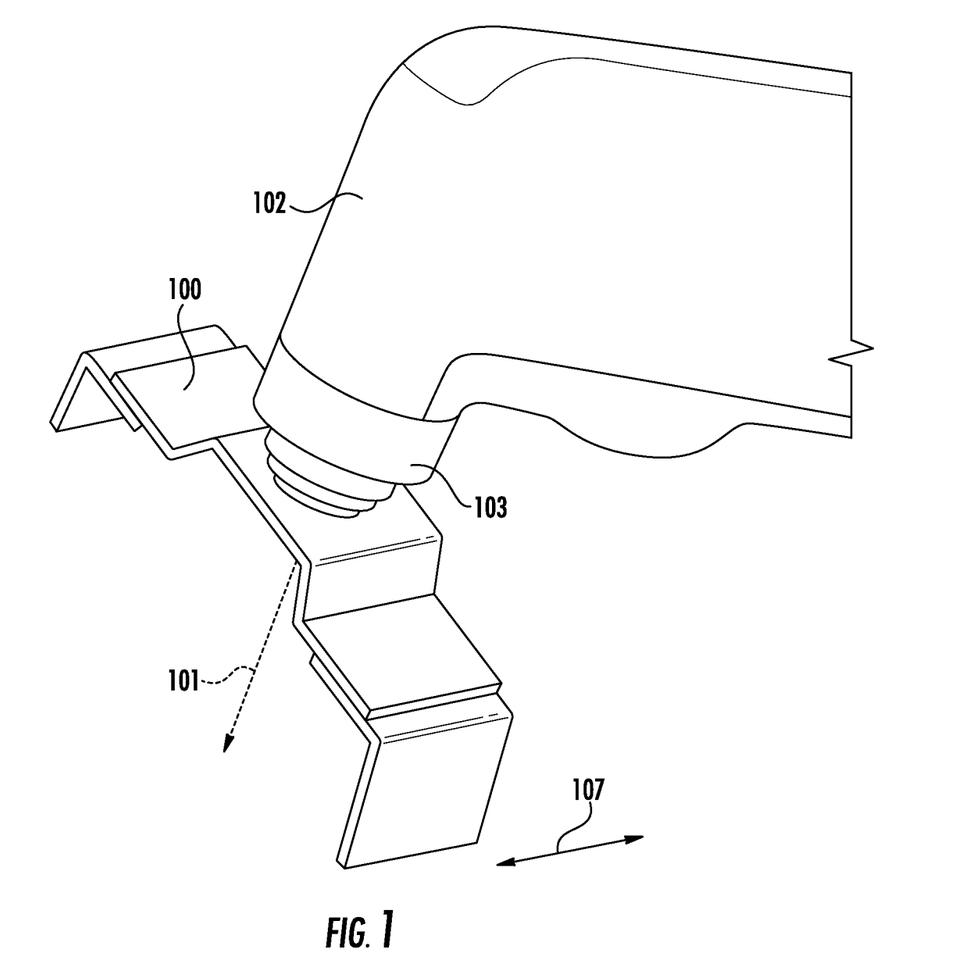
FIG. 1 is a top perspective view of a blade attachment for cutting an opening coupled to a portable or handheld tool.

This disclosure is directed to an improved blade attachment 100 for use with an oscillating portable or handheld power tool 102, as shown in FIG. 1. The blade attachment 100 may be formed of steel or another hard material typically used for power tool attachments, depending on the surface being cut, and is coupled to a nose portion 103 of the power tool 102. An advantage of the particular blade attachment 100 of the present disclosure is that it enables simultaneously cutting two parallel lines in an easy and efficient manner. An opening, such as a rectangular shaped opening, can be cut by simply measuring and marking two corners or vertices of the desired opening, aligning the blade attachment 100 with the first corner and using the blade attachment 100 to cut a first set of parallel lines, and then aligning the blade attachment 100 with the second corner and using the blade attachment 100 to cut a second set of parallel lines, the blade attachment 100 cuts a rectangular opening in a few easy steps.

The blade attachment 100 may cut a target surface to form an opening in one of a variety of geometries such as, for example, a hexagon, an octagon, or another shape having corners or vertices. The blade attachment 100 is coupled to the nose portion 103 of the power tool 102 along an oscillation axis 101 of the power tool 102, and the power tool 102 oscillates the blade attachment 100 around the oscillation axis 101. To make a cut, the blade attachment 100 is oscillated by the tool 102 in an oscillation direction, shown by the arrow 107, to enable the blade attachment 100 to saw into the surface to be cut. The oscillation direction 107 is arranged perpendicularly to the oscillation axis 101 of the blade attachment 100.

Figure 2A:
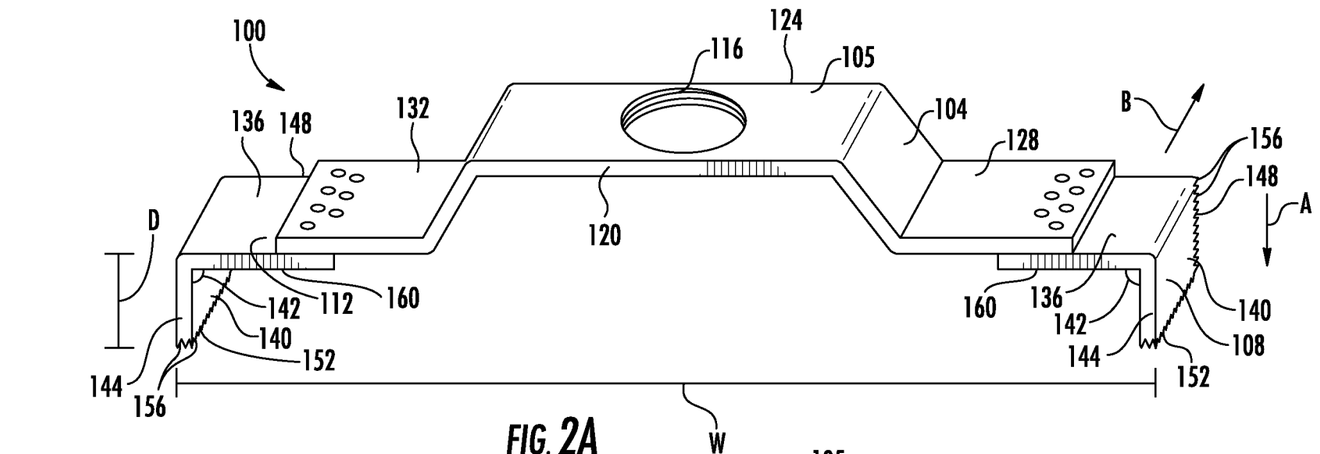
FIG. 2A is a top perspective view of the blade attachment of FIG. 1.

Turning now to FIG. 2A, the blade attachment 100 includes an intermediate portion 104, and a first blade portion 108 and a second blade portion 112 coupled to the intermediate portion 104 so as to extend from opposite sides of the intermediate portion 104. The first blade portion 108 and the second blade portion 112 can be coupled to the intermediate portion 104 by welding or clamping or any other method which provides a secure, non-movable connection between the parts. In an alternative embodiment, the blade intermediate portion 104 can be integrally formed with the first and second blade portions 108, 112.

The intermediate portion 104 includes an interface portion 105 having an opening 116, a front side 120, a cutting side 124, a first arm 128, and a second arm 132. The opening 116 may be centrally positioned on and extends through the interface portion 105. In an alternative embodiment, the opening 116 can extend into, but not through, the interface portion 105. The opening 116 is configured to receive the nose portion 103 (shown in FIG. 1) of power tool 102 (shown in FIG. 1) to matingly engage the nose portion 103 and thereby couple the blade attachment 100 to the power tool 102. Accordingly, the opening 116 has a shape and size configured to mate with a complementary portion on the nose portion 103 of the power tool 102. In alternative embodiments, the intermediate portion 104 can include other features, in addition to or instead of the opening 116, which engage complementary features on the nose portion 103 to couple the blade attachment 100 to the power tool 102.

Returning now to FIG. 2A, the front side 120 of the interface portion 105 faces in an opposing direction relative to the cutting side 124, and when the blade attachment 100 is coupled to the power tool to be used for cutting, the front side 120 faces away from the direction that the cut will be made while the cutting side 124 faces in the direction that the cut will be made. The first arm 128 and the second arm 132 are arranged opposite one another and each extends from the front side 120 to the cutting side 124 of the intermediate portion 104. The first arm 128 is configured to couple with the first blade portion 108 and the second arm 132 is configured to couple with the second blade portion 112 to form the blade attachment 100.

The first blade portion 108 and the second blade portion 112 are substantially similar and mirror one another on opposite sides of the blade attachment 100. Each of the first blade portion 108 and the second blade portion 112 includes an interface leg 136 and a blade leg 140. The interface legs 136 are configured to couple to the respective first arm 128 and second arm 132 of the intermediate portion 104, and each of the blade legs 140 extends from the respective interface leg 136 at an angle 142. In the present embodiment, the angle 142 is approximately 90° to form the first blade portion 108 and the second blade portion 112 in "L" shapes. In alternative embodiments, the blade legs 140 can extend from the interface legs 136 at the angle 142 of less than or greater than approximately 90°.

Each blade leg 140 extends downwardly from the respective interface leg 136 in a direction parallel to the oscillation axis 101 (shown in FIG. 1). Each blade leg 140 includes a front edge 144, a back edge 148, and a bottom edge 152. The back edges 148 are arranged so as to face in a direction opposite the front edges 144, and the front edges 144 are arranged so as to face in the same direction as the front side 120 of the intermediate portion 104. Accordingly, when the blade attachment 100 is coupled to the power tool to be used for cutting, the front edges 144 face away from the direction that the cut will be made and the back edges 148 face in the direction that the cut will be made. The front edges 144 and the back edges 148 are arranged to be parallel to the oscillation axis 101 (shown in FIG. 1). The bottom edges 152 extend from the front edges 144 to the back edges 148 and are arranged opposite the 90° angle formed between the blade legs 140 and the interface legs 136. The bottom edges 152 are arranged to be parallel to the oscillation direction 107 (shown in FIG. 1). When the first blade portion 108 and the second blade portion 112 are coupled to the intermediate portion 104 as shown in FIG. 2A, the front edges 144 on the first blade portion 108 and the second blade portion 112 are arranged opposite one another on the blade attachment 100 and minor one another such that they are parallel and face in the same direction. Likewise, the back edges 148 and the bottom edges 152 are arranged opposite one another, respectively, and minor one another such that they are parallel and face in the same direction.

Figure 2B:
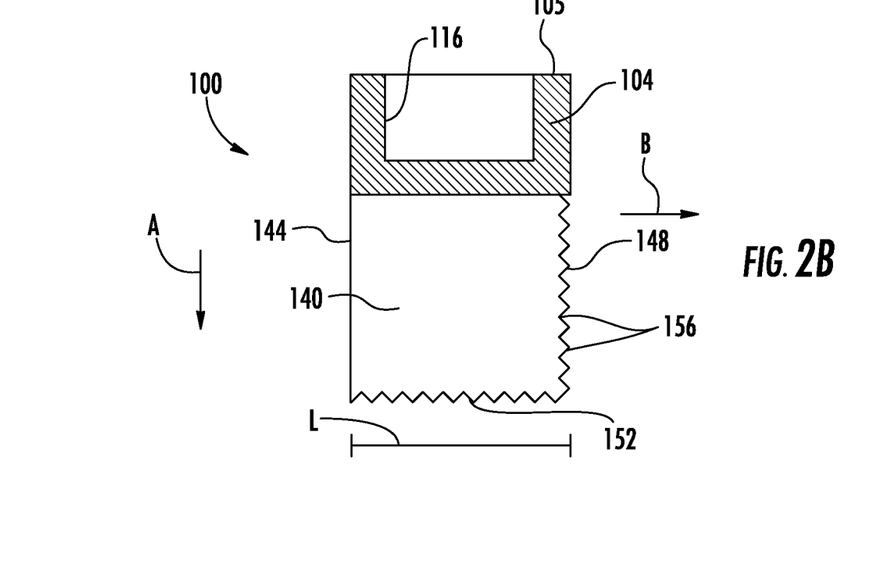
FIG. 2B is a side cross-sectional view of the blade attachment of FIG. 2A.

FIG. 2B depicts a side cross sectional view of the blade attachment 100 and illustrates that the back edges 148 and the bottom edges 152 of the first blade portion 108 and the second blade portion 112 each include teeth 156 such that the first and second blade portions 108, 112 are serrated so as to form saws. The front edges 144 do not include teeth because the front edges 144 face away from the direction that the cut will be made and therefore do not need to include serrations. In use, the blade attachment 100 is first pressed into the surface to be cut in the direction of the arrow A (shown in both FIGS. 2A and 2B). Because the bottom edges 152 are parallel to one another, the teeth 156 on the bottom edges 152 of both the first blade portion 108 and the second blade portion 112 simultaneously contact and press into the surface on opposite sides of the blade attachment 100. The blade attachment 100 is then moved in the direction of the arrow B (shown in both FIGS. 2A and 2B). Because the back edges 148 are parallel to one another, the teeth 156 on the back edges 148 of both the first blade portion 108 and the second blade portion 112 simultaneously make parallel cuts in the surface.

Returning to FIG. 2A, the blade attachment 100 has a width W defined by a distance between the bottom edge 152 of the first blade portion 108 and the bottom edge 152 of the second blade portion 112. The width W of the blade attachment 100 dictates a distance between the parallel cuts made simultaneously in the surface by the first blade portion 108 and the second blade portion 112 of the blade attachment 100. In the embodiment shown, the width W of the blade attachment 100 is approximately 4 inches. In an alternative embodiment, the width W is 2 inches. Both widths are typical for cutting an opening for an outlet box. It will be understood that different blade attachments 100 having different widths W can be used to make parallel cuts spaced apart from one another by different distances. In one alternative embodiment, the first blade portion 108 and the second blade portion 112 are adjustable relative to the intermediate portion 104 so that by moving the blade portions 108, 112 toward or away from the opening 116 of the intermediate portion 104, the width W can be decreased or increased, respectively. In this embodiment, the first blade portion 108 and the second blade portion 112 are able to be fixed to the intermediate portion 104 once positioned at the desired width. One advantage of this embodiment is that a single blade attachment 100 can be used to make parallel cuts spaced different distances from one another.

The blade attachment 100 also has a depth D, defined by a distance between the bottom edges 152 of the first and second blade portions 108, 112 and the angles 142 formed in the first and second blade portions 108, 112. The depth D of the blade attachment 100 dictates a depth of the cut made in the surface by the blade attachment 100 because an underside 160 of each of the interface legs 136 of the first and second blade portions 108, 112 will abut the surface being cut, thereby preventing the blade legs 140 of the first and second blade portions 108, 112 from being inserted any farther into the surface. In the embodiment shown, the depth D is approximately ½ inch, which is adequate for cutting openings for outlet boxes in typical wall surfaces. It will be understood that different blade attachments 100 having different depths D can be used to make cuts having different depths.

The blade attachment 100 also has a length L (shown in FIG. 2B), defined by the length of the bottom edge 152 of the first and second blade portions 108, 112. The length L defines the minimum length of a cut that can be made by pressing the blade attachment 100 into the surface. Accordingly, it is possible to use a blade attachment having a larger length which is equal to an entire desired length of the cut in the surface. In this case, the user would not need to move the blade attachment 100 along the surface in direction B once the blade attachment 100 was pressed into the surface in direction A, because the entire desired length of the cut would be made by pressing the blade attachment 100 into the surface.

Figure 3A:
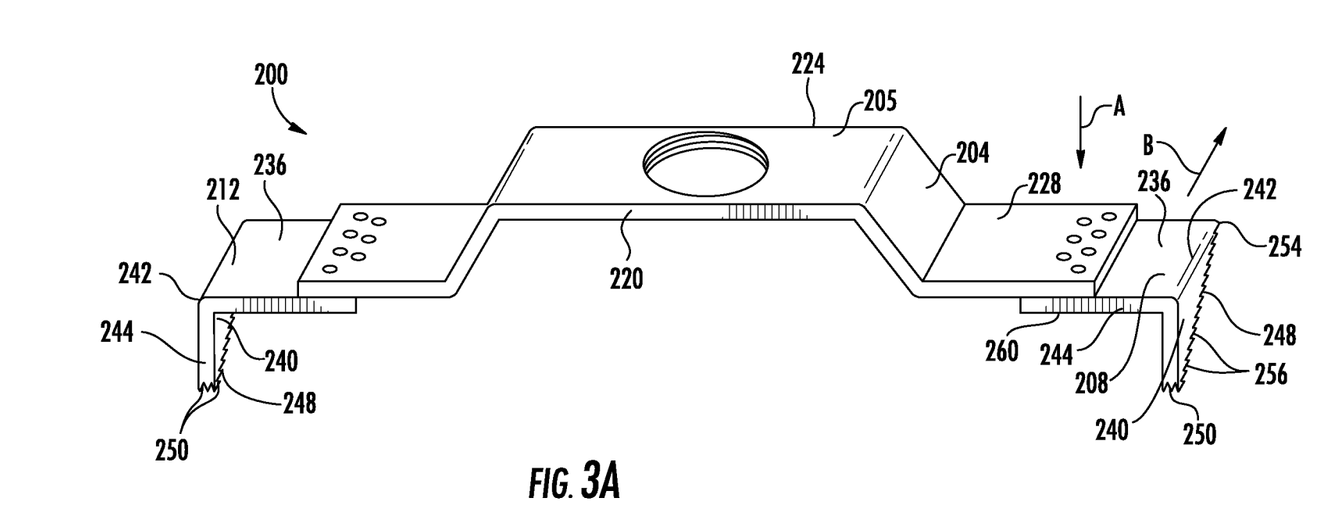
FIG. 3A is a top perspective view of another blade attachment for cutting an opening.
Figure 3B:
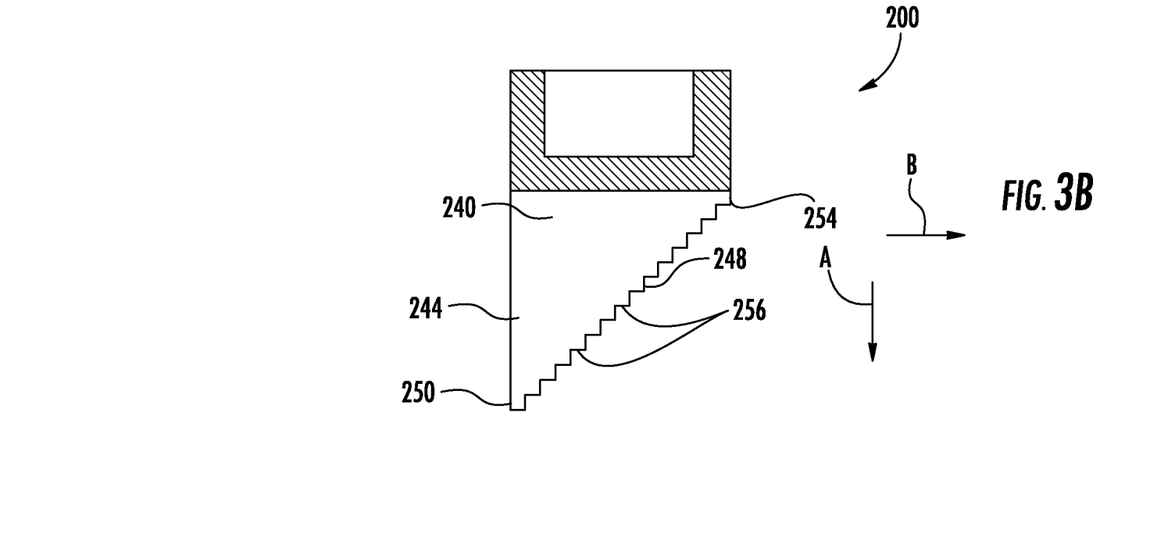
FIG. 3B is a side cross-sectional view of the blade attachment of FIG. 3A.

Another blade attachment 200 is depicted in FIGS. 3A and 3B. The blade attachment 200 is substantially similar in structure and function to the blade attachment 100 described above. An intermediate portion 204 includes an interface portion 205 having an opening 216, a front side 220, a cutting side 224, a first arm 228, and a second arm 232. The opening 216 may be centrally positioned on and extends through the interface portion 205. The blade attachment 200, however, includes angularly formed blade legs 240 on the first and second blade portions 208, 212. The angularly formed blade legs 240 each include a front edge 244 and an angled edge 248. Each angled edge 248 extends from a bottom 250 at the front edge 244 of the respective blade leg 240 to a back 254 at the angle 242 where the blade leg 240 joins the respective interface leg 236 of the first and second blade portions 208, 212. In this embodiment, when the blade attachment 200 is used, the angled edges 248 of the angularly formed blade legs 240 are both inserted into the surface in the direction A and moved in the direction B to form the parallel cuts.

In use, the blade attachment 200 is first pressed into the surface to be cut in the direction of the arrow A (shown in both FIGS. 3A and 3B). Because the bottoms 250 are parallel to one another, the teeth 256 at the bottoms 250 of both the first blade portion 208 and the second blade portion 212 simultaneously contact and press into the surface on opposite sides of the blade attachment 200. The blade attachment 200 is then moved in the direction of the arrow B (shown in both FIGS. 3A and 3B). Because the angled edges 248 are parallel to one another, the teeth 256 on the angled edges 248 of both the first blade portion 208 and the second blade portion 212 simultaneously make parallel cuts in the surface.

Figure 4:
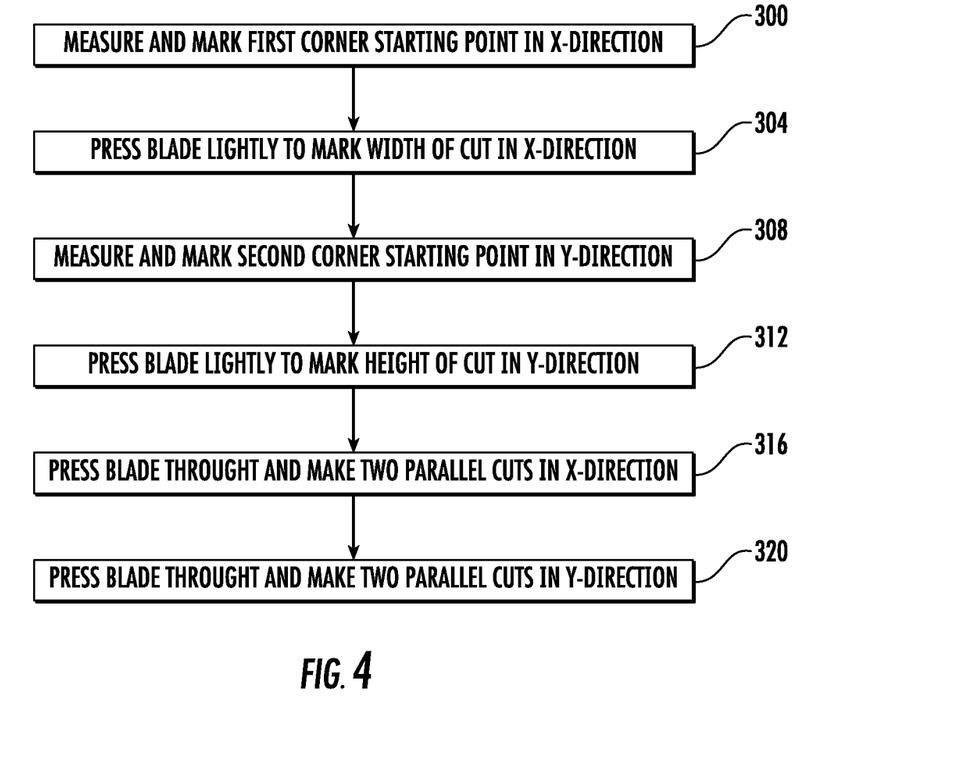
FIG. 4 is a flow chart depicting a method according to the disclosure for cutting an opening.

Turning now to FIG. 4, a flow chart depicting a method of using the blade attachments 100 and 200 to cut rectangularly shaped openings is shown. First, the user measures and marks a position of the first corner of the rectangular opening to be cut in the x-direction (300). The user then aligns the first blade portion 108, 208 of the blade attachment 100, 200 having a desired width with the x-direction marking and lightly presses the teeth 156, 256 on the bottom edges 152 or the angled edges 248 of the blade attachment 100, 200 onto the surface to be cut to form width markings to mark the width of the intended cut (304). The user then measures and marks a position of the second corner of the rectangular opening to be cut in the y-direction (308). The user then aligns the first blade portion 108, 208 of the blade attachment 100, 200 with the y-direction marking and lightly presses the teeth 156, 256 on the bottom edges 152 or the angled edges 248 of the blade attachment 100, 200 onto the surface to be cut to form height markings to mark the height of the intended cut (312). The user then turns the power tool on and presses the blade attachment 100, 200 into the surface along the width markings of the intended cut. The teeth 156, 256 on the bottom edges 152 or the angled edges 248 of the blade attachment 100, 200 cut into the surface until the undersides 160, 260 of the interface legs 128, 228 of the blade portions contact the surface. The user then moves the power tool to cut the surface with the back edges 148 or the angled edges 248 of the blade portions to form two parallel cuts (316) which are the sides of the rectangular opening. The user then rotates the power tool to align the teeth 156, 256 at an angle of 90° relative to the parallel cuts and likewise presses the blade attachment 100, 200 into the surface along the height markings of the intended cut. The teeth 156, 256 on the bottom edges 152 or the angled edges 248 of the blade attachment 100, 200 cut into the surface until the undersides 160, 260 of the interface legs 128, 228 of the blade portions contact the surface. The user then moves the power tool to cut the surface with the back edges 148 or the angled edges 248 of the blade portions to form two parallel cuts (320) which are the top and bottom of the rectangular opening.

In one aspect of the present disclosure, a blade attachment for mounting on an oscillating handheld power tool comprises two blade portions arranged on opposite sides of the blade attachment such that they are parallel to and mirror one another. Each blade portion simultaneously makes a cut such that two parallel cuts are made by one action.

While various embodiments of the present disclosure have been shown and described, it will be understood that other modifications, substitutions, and alternatives are apparent to one of ordinary skill in the art. Such modifications, substitutions, and alternatives can be made without departing from the spirit and scope of the disclosure.

What is claimed is:

1. A blade attachment for mounting on a power tool, the blade attachment comprising:
   an intermediate portion configured to be coupled to the power tool to be oscillated by the power tool about an oscillation axis, the intermediate portion including:
      a central portion having an upper central surface and an opposite surface directly opposed to the upper central surface, the central portion having an opening extending through the upper central surface and through the opposite surface in a direction along an opening axis, the opening configured to engage with the power tool;
      a first connecting portion extending from a first side of the central portion, the first connecting portion having a first upper surface that is contiguous with the upper central surface;
      a first extension extending from the first connecting portion along a first direction away from the opening and having a second upper surface that is contiguous with the first upper surface, the second upper surface parallel to the upper central surface and not coplanar with the upper central surface;
a second connecting portion extending from a second side of the central portion, the second connecting portion having a third upper surface that is contiguous with the upper central surface; and
a second extension extending from the second connecting portion along a second direction away from the opening and having a fourth upper surface that is contiguous with the third upper surface, the opening axis interposed between the second side and the first side, the fourth upper surface parallel to the upper central surface and not coplanar with the upper central surface;
a first blade portion directly coupled to the first extension of the intermediate portion, the first blade portion including a first plurality of cutting teeth; and
a second blade portion directly coupled to the second extension of the intermediate portion, the second blade portion including a second plurality of cutting teeth, wherein:
the first blade portion and the second blade portion are coupled to the intermediate portion such that the first blade portion and the second blade portion are arranged to mirror one another on opposite sides of the intermediate portion;
the first blade portion is directly coupled to a fifth surface of the first extension, the fifth surface directly opposed to the second surface; and
the second blade portion is directly coupled to a sixth surface of the second extension, the sixth surface directly opposed to the fourth surface.

2. The blade attachment of claim 1, wherein:
each of the first blade portion and the second blade portion includes an interface leg coupled to the intermediate portion,
each of the first blade portion and the second blade portion includes a blade leg, and
the blade leg of the first blade portion includes the first plurality of cutting teeth and the blade leg of the second blade portion includes the second plurality of cutting teeth.

3. The blade attachment of claim 2, wherein each interface leg is formed at an angle relative to each blade leg.

4. The blade attachment of claim 3, wherein the angle is approximately 90 degrees.

5. The blade attachment of claim 2, wherein:
each interface leg is arranged parallel to the upper central surface, and
each blade leg is arranged perpendicularly to the upper central surface.

6. The blade attachment of claim 1, wherein the first plurality of cutting teeth are parallel to the second plurality of cutting teeth.

7. The blade attachment of claim 1, wherein a width between the first plurality of cutting teeth and the second plurality of cutting teeth defines a cut width of a cut made by the blade attachment.

8. The blade attachment of claim 7, wherein the width is equal to or less than approximately 4 inches.

9. The blade attachment of claim 8, wherein the width is equal to or less than approximately 2 inches.

10. The blade attachment of claim 1, wherein the first blade portion and the second blade portion project from the intermediate portion in a direction parallel to the central surface.

11. The blade attachment of claim 1, wherein the second upper surface is coplanar with the fourth upper surface.

12. The blade attachment of claim 1, wherein:
the second upper surface is separated from the upper central surface by the first upper surface, and
the fourth upper surface is separated from the upper central surface by the third upper surface.

13. A method of cutting an opening with a power tool, the method comprising:
simultaneously pressing a first blade portion and a second blade portion of a blade attachment into a surface to be cut, the blade attachment including:
an intermediate portion coupled to the power tool to be oscillated by the power tool about an oscillation axis, the intermediate portion including:
a central portion having an upper central surface and an opposite surface directly opposed to the upper central surface, the central portion having an opening extending through the central surface and through the opposite surface in a direction along an opening axis, the opening configured to engage with the power tool;
a first connecting portion extending from a first side of the central portion, the first connecting portion having a first upper surface that is contiguous with the upper central surface;
a first extension extending from the first connecting portion along a first direction away from the opening and having a second upper surface that is contiguous with the first upper surface, the second upper surface parallel to the upper central surface and not coplanar with the upper central surface;
a second connecting portion extending from a second side of the central portion, the second connecting portion having a third upper surface that is contiguous with the upper central surface; and
a second extension extending from the second connecting portion along a second direction away from the opening and having a fourth upper surface that is contiguous with the third upper surface, the opening axis interposed between the second side and the first side, the fourth upper surface parallel to the upper central surface and not coplanar with the upper central surface, wherein:
the first blade portion is directly coupled to the first extension of the intermediate portion, the first blade portion including a first plurality of cutting teeth;
the second blade portion is directly coupled to the second extension of the intermediate portion;
the second blade portion includes a second plurality of cutting teeth;
the first blade portion and the second blade portion are coupled to the intermediate portion such that the first blade portion and the second blade portion are arranged to mirror one another on opposite sides of the intermediate portion:
the first blade portion is directly coupled to a fifth surface of the first extension, the fifth surface directly opposed to the second surface; and
the second blade portion is directly coupled to a sixth surface of the second extension, the sixth surface directly opposed to the fourth surface;
moving the blade attachment in a first direction along the surface to be cut to simultaneously form two parallel cuts in the surface;

rotating the power tool to align the two blade portions at an angle relative to the two parallel cuts; and moving the blade attachment in a second direction along the surface to be cut to simultaneously form two further parallel cuts in the surface.

14. The method of claim 13, wherein said rotating the power tool includes rotating the power tool approximately 90 degrees such that the angle relative to the two parallel cuts is approximately 90 degrees.

15. The method of claim 13, wherein the second direction is perpendicular to the first direction.

\* \* \* \* \*